United States Patent
Crider et al.

(10) Patent No.: US 7,316,799 B2
(45) Date of Patent: *Jan. 8, 2008

(54) BLOW-MOLD WHEEL SPEED-UP PACKAGE

(75) Inventors: Matt Crider, York, PA (US); Mike Kelly, Red Lion, PA (US)

(73) Assignee: Graham Packaging Company, L.P., York, PA (US)

( * ) Notice: Subject to any disclaimer, the term of this patent is extended or adjusted under 35 U.S.C. 154(b) by 171 days.

This patent is subject to a terminal disclaimer.

(21) Appl. No.: 11/102,701

(22) Filed: Apr. 11, 2005

(65) Prior Publication Data

US 2005/0173843 A1    Aug. 11, 2005

Related U.S. Application Data

(63) Continuation of application No. 10/426,963, filed on May 1, 2003, now Pat. No. 6,884,383.

(51) Int. Cl.
*B29C 49/36* (2006.01)
*B29C 49/70* (2006.01)

(52) U.S. Cl. ............... 264/543; 264/334; 425/537; 425/540

(58) Field of Classification Search ........... 264/334, 264/543; 425/537, 540
See application file for complete search history.

(56) References Cited

U.S. PATENT DOCUMENTS

| | | | |
|---|---|---|---|
| 3,981,667 A | 9/1976 | Bilodeau | |
| 4,005,966 A | 2/1977 | Nutting | |
| 4,197,071 A | 4/1980 | Salle et al. | |
| 4,213,750 A | 7/1980 | Kubota et al. | |
| 4,752,206 A | 6/1988 | Nowicki et al. | |
| 5,039,298 A | 8/1991 | Takakusaki et al. | |
| 5,049,061 A | 9/1991 | Billoud | |
| 5,681,597 A | 10/1997 | Aguilar et al. | |
| 6,386,858 B1 | 5/2002 | Riddell | |
| 6,884,383 B2 * | 4/2005 | Crider et al. | 425/540 |

* cited by examiner

*Primary Examiner*—Robert B. Davis
(74) *Attorney, Agent, or Firm*—Knoble Yoshida & Dunleavy, LLC

(57) ABSTRACT

A system is provided for use with a container molding machine having a mold wheel, the mold wheel having a plurality of molds for molding the containers, each of the molds having an opening direction substantially parallel to a rotational axis of the mold wheel. The system has a mold opening controller and a receiving device for receiving the containers dropped from the mold wheel and transferring the containers to a container conveyor. The receiving device has a longitudinal direction substantially perpendicular to the opening direction of the molds and substantially parallel to a longitudinal axis of the container when released from the mold. The longitudinal direction of the receiving device is non-horizontal.

18 Claims, 2 Drawing Sheets

BLOW-MOLD WHEEL SPEED-UP PACKAGE

This application is a continuation of U.S. patent application No. 10/426,963 filed May 1, 2003, now U.S. Pat. No. 6,884,383.

BACKGROUND OF THE INVENTION

The invention relates to a container molding process. More particularly, the invention relates to systems and methods for increasing the production rate of a wheel type blow-mold machine.

One commonly used wheel type blow-mold machine produces continuous extrusion blow-molded plastic containers. It will be understood that to form a polyolefin continuous extrusion blow-molded plastic container, a parison can be heated in an extruder, captured by a mold, and blown in the mold. Specifically, to form the cavity of the container, a parison can be extruded into the mold and as the mold comes together, a pneumatic blow pin, for example, can pierce the parison and blow the parison up against the walls of the mold. The mold typically contains flash pockets above and below the cavity in the mold to capture the excess of the parison that is forced above and below the cavity. When the parison is blown inside the mold, it is forced into the flash pockets and portions of the parison must adhere together. The excess flash can then be cut away from the container after it is ejected from the mold.

There is a benefit that can be realized by producing wheel type blow-mold machines capable of high production rates and of modifying existing wheel type blow-mold machines to increase their production rates.

SUMMARY OF THE INVENTION

Embodiments of the invention provide systems and methods for increasing the production rates of wheel type mold machines, for example, wheel type blow-mold machines, while maintaining a significant portion of the structure of existing wheel type mold machines.

Embodiments of the invention provide a system for use with a container molding machine having a mold wheel, the mold wheel having a plurality of molds for molding the containers, each of the molds having an opening direction substantially parallel to a rotational axis of the mold wheel. The system has a mold opening controller and a receiving device for receiving the containers dropped from the mold wheel and transferring the containers to a container conveyor. The receiving device has a longitudinal direction substantially perpendicular to the opening direction of the molds and substantially parallel to a longitudinal axis of the container when released from the mold. The longitudinal direction of the receiving device is non-horizontal.

Other embodiments of the invention provide an apparatus for blow molding containers. The apparatus has a mold wheel having a rotational axis, a plurality of molds attached to the mold wheel, the molds being openable for discharging the containers after molding, and each of the molds having an opening direction substantially parallel to the rotational axis of the mold wheel, and an air blower for introducing blow air into the molds to form the containers within the molds. The apparatus also has a mold opening controller for controlling when the molds are opened and closed, and a receiving device for receiving the containers dropped from the mold wheel and transferring the containers to a container conveyor. The receiving device has a longitudinal direction substantially perpendicular to the opening direction of the molds and substantially parallel to a longitudinal axis of the container when released from the mold. The longitudinal direction of the receiving device is non-horizontal.

Other embodiments of the invention provide a method of increasing the production rate of a container molding machine having a mold wheel, the mold wheel having a plurality of molds for molding containers, each of the molds having an opening direction substantially parallel to a rotational axis of the mold wheel. The method increases a rotational duration over which the molds are held in a closed position to mold the containers, increases a rotational duration over which blow air is introduced to each of the molds, and angles a receiving device for receiving the containers dropped from the mold wheel and transferring the containers to a container conveyor. The receiving device has a longitudinal direction substantially perpendicular to the opening direction of the molds and substantially parallel to a longitudinal axis of the container when released from the mold. The angling of the receiving device is such that the longitudinal direction of the receiving device is non-horizontal.

BRIEF DESCRIPTION OF THE DRAWINGS

The invention is explained below in further detail with the aid of exemplary embodiments shown in the drawings, wherein.

DETAILED DESCRIPTION OF THE INVENTION

The invention is explained in the following with the aid of the drawings in which like reference numbers represent like elements.

Figure 1:
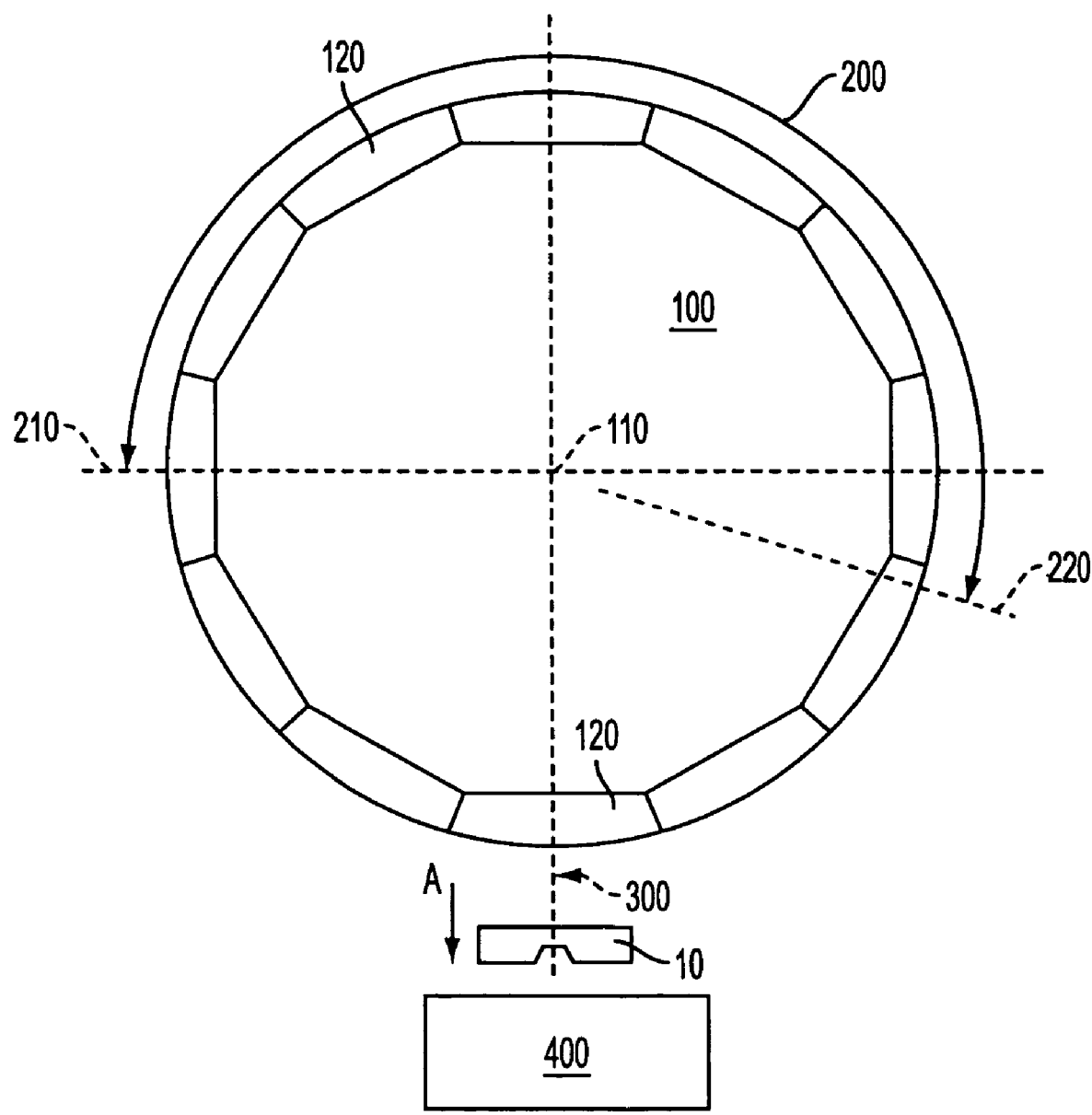
FIG. 1 is a side schematic view of a currently used wheel type blow-mold machine.

FIG. 1 shows a wheel type blow-mold machine for producing containers 10. The machine shown in FIG. 1 has a mold wheel 100 that revolves, in this example clockwise, around a central axis 110. Mold wheel 100 has 12 molds 120 attached to its outer perimeter. Although 12 molds 120 are shown in this example, it is noted that any practical number of molds can be used.

In the case of a continuous extrusion blow-molded plastic container producing process, each mold 120 has two parts that are pressed together to form a mold cavity. The mold parts are then separated from each other to allow the molded container to drop from the mold. In the example shown in FIG. 1, the parison is captured between the mold parts as the mold parts come together at point 210 along the rotational path of wheel 100. At point 210 or soon thereafter, blow air is introduced into the parison to blow the parison up against the interior walls of the mold. The blow air continues for a blow air duration 200 and is turned off at point 220. While the blow air's primary function is to inflate the parison to form the container, it also serves the function of cooling the container material sufficiently before the mold parts are opened and the molded container is released from mold 120. A significant factor in determining the highest acceptable rotational rate of wheel 100 is the amount of time needed for the molded container to cool sufficiently before it is released from mold 120.

At some point after the blow air is turned off at point 220, mold 120 begins to open, resulting in container 10 dropping from mold 120 at drop point 300. Container 10 falls in direction A from mold 120 into a receiving device 400.

Receiving device 400 receives container 10 in a manner as to not damage container 10 and moves container 10 away from mold wheel 100 before the next container is released from the next mold 120. Receiving device 400 can be attached to a conveyor to move the completed containers 10 to the next step in the processing such as, for example, flash removing and container separation.

The opening and closing points of molds 120 can be controlled by use of a cam shape such that each mold opens and closes at a predetermined position along the rotation of the wheel. Similarly, the points at which the blow air is turned on and off can be controlled by a cam.

Figure 2:
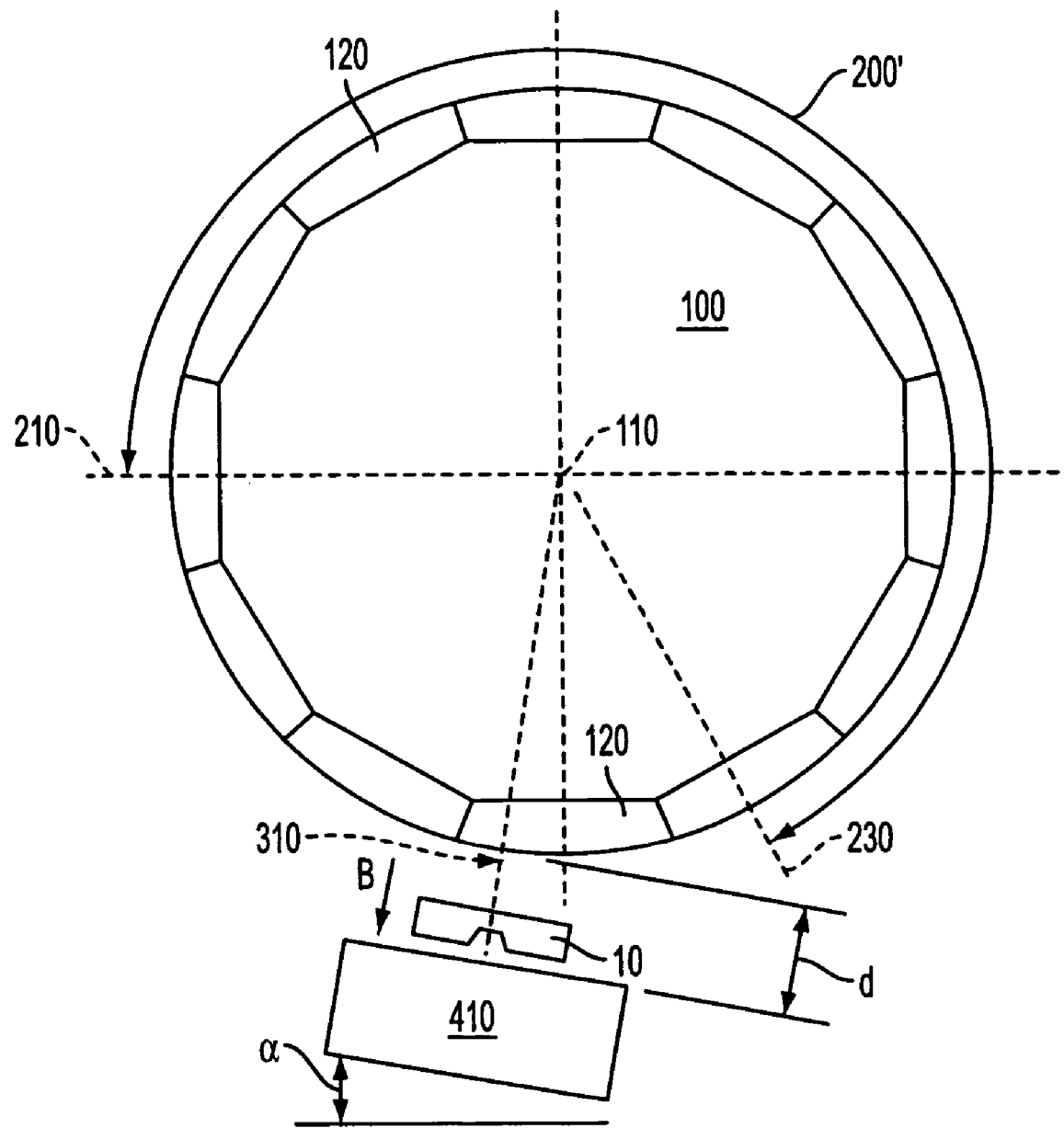
FIG. 2 is a side schematic view of an example of an embodiment of the invention.

FIG. 2 shows an example of an embodiment of the invention. In the example shown in FIG. 2, the blow air duration 200' is longer than the blow air duration 200 shown in FIG. 1. For example, blow air duration 200' can be 230° compared to a duration of 200° of blow air duration 200. As stated above, molds 120 must stay closed a sufficient length of time for containers 10 to achieve sufficient rigidity before molds 120 are opened. The maximum allowable rotational speed of mold wheel 100 is limited by this required cooling time of containers 10 before molds 120 can be opened.

In the example shown in FIG. 1, 5.2 seconds of blow air on-time is achieved with a wheel rotational speed of 6.5 revolutions per minute and 200° of blow air duration. By increasing the blow air duration (as shown in FIG. 2) to 230°, the rotational speed of wheel 100 can be increased while still maintaining the required blow air on-time. For example, wheel 100 shown in FIG. 2 provides 5.3 seconds of blow air on-time at a rotational speed of 7.3 revolutions per minute. Therefore, the example shown in FIG. 2 provides slightly increased blow air on-time (cooling time) than the device shown in FIG. 1 while increasing the rotational speed of mold wheel 100. This increase in rotational speed is directly proportional to an increase in production of containers. Mold wheels such as mold wheel 100 commonly produce two (or more) containers 10 in each mold 120. In the case of mold wheel 100 having twelve molds 120 with each mold forming two containers 10, 24 containers 10 are formed with each revolution of wheel 100. Therefore, at 6.5 revolutions per minute, 156 containers are produced in one minute (6.5×24) and at 7.3 revolutions per minute, 175 containers are produced in one minute (7.3×24). As can be seen from these calculations, the systems and methods of the invention can greatly increase the productivity of mold wheels.

In order to allow the increased blow air duration 200' (as compared to blow air duration 200), receiving device 410 is position as shown in FIG. 2. This position of receiving device 410 allows more rotational duration between blow air off point 230 and drop point 310 than would exist if the receiving device was positioned as shown in FIG. 1.

Particular embodiments of the invention provide for opening the molds such that each of the containers is released from the mold wheel after the mold molding that container has rotated past a lowest point of rotation of the mold wheel. For example, the molds can be opened such that each of the containers is released from the mold wheel between 5° and 40° of rotation past the lowest point of rotation of the mold wheel. More particularly, the molds can be opened such that each of the containers is released from the mold wheel between 10° and 30° of rotation past the lowest point of rotation of the mold wheel. More particularly still, the molds can be opened such that each of the containers is released from the mold wheel approximately 15° of rotation past the lowest point of rotation of the mold wheel.

The invention can provide a blow air controller for controlling blow air that molds the containers within the molds. The blow air controller turns the blow air on and off such that the blow air is on in each mold for at least 200° of rotation of the mold wheel. In another embodiment, the blow air can be on for each mold for at least 220° of rotation of the mold wheel. In yet another embodiment, the blow air can be on for each mold for approximately 240° of rotation of the mold wheel.

In order for receiving device 410 to catch containers 10 as they drop from wheel 100 in such a way as to minimize damage to containers 10 and to minimize bouncing of containers 10, receiving device 410 is tilted at an angle α. Angle α is determined based on the drop direction B at which containers 10 drop from molds 120 which is, in turn, dependant upon the point at which molds 120 open and the rotation speed of wheel 100. To further increase the effectiveness of receiving device 410, the distance d from mold 120 to receiving device 410 can be adjusted. For particular existing mold wheels 100, it is preferable to reduce distance d, for example by 4", when modifying the existing wheel with the systems and methods of the invention.

As stated above, the blow air on and off points and mold opening and closing points can be controlled by cams. If such cams are used, the cams may need adjusting to provide the blow air and mold control required by the invention. In addition, if the rotational speed of mold wheel 100 is changed, a gear ratio change in the drive mechanism of wheel 100 may be necessary.

The invention has been described in detail with respect to preferred embodiments and it will now be apparent from the foregoing to those skilled in the art that changes and modifications may be made without departing from the invention in its broader aspects. The invention, therefore, is intended to cover all such changes and modifications that fall within the true spirit of the invention.

What is claimed is:

1. A system for use with a container molding machine having a mold wheel, the mold wheel having a plurality of molds for molding the containers, each of the molds having an opening direction substantially parallel to a rotational axis of the mold wheel, the system comprising:
    a mold opening controller; and
    a receiving device for receiving the containers dropped from the mold wheel and transferring the containers to a container conveyor,
        the receiving device having a longitudinal direction substantially perpendicular to the opening direction of the molds and substantially parallel to a longitudinal axis of the container when released from the mold, and
        the longitudinal direction of the receiving device being non-horizontal and wherein the longitudinal direction of the receiving device is between 10° and 30° from horizontal.

2. The system of claim 1, wherein the longitudinal direction of the receiving device is approximately 15° from horizontal.

3. A system for use with a container molding machine having a mold wheel, the mold wheel having a plurality of molds for molding the containers, each of the molds having an opening direction substantially parallel to a rotational axis of the mold wheel, the system comprising:
    a mold opening controller; and
    a receiving device for receiving the containers dropped from the mold wheel and transferring the containers to a container conveyor, the receiving device having a longitudinal direction substantially perpendicular to the opening direction of the molds and substantially parallel to a longitudinal axis of the container when released from the mold, and the longitudinal direction of the receiving device being non-horizontal and wherein the mold opening controller is for opening the molds such that each of the containers is released from the mold wheel after the mold molding that container has rotated past a lowest point of rotation of the mold wheel.

4. A system for use with a container molding machine having a mold wheel, the mold wheel having a plurality of molds for molding the containers, each of the molds having an opening direction substantially parallel to a rotational axis of the mold wheel, the system comprising:

a mold opening controller; and a receiving device for receiving the containers dropped from the mold wheel and transferring the containers to a container conveyor, the receiving device having a longitudinal direction substantially perpendicular to the opening direction of the molds and substantially parallel to a longitudinal axis of the container when released from the mold, and the longitudinal direction of the receiving device being non-horizontal; and a blow air controller for controlling blow air that molds the containers within the molds, wherein the blow air controller turns the blow air on and off such that the blow air is on in each mold for at least 200° of rotation of the mold wheel.

5. The system of claim 4, wherein the blow air is on for each mold for at least 220° of rotation of the mold wheel.

6. The system of claim 5, wherein the blow air is on for each mold for approximately 240° of rotation of the mold wheel.

7. An apparatus for blow molding containers, the apparatus comprising:

a mold wheel having a rotational axis;

a plurality of molds attached to the mold wheel, the molds being openable for discharging the containers after molding, and each of the molds having an opening direction substantially parallel to the rotational axis of the mold wheel;

an air blower for introducing blow air into the molds to form the containers within the molds;

a mold opening controller for controlling when the molds are opened and closed; and a receiving device for receiving the containers dropped from the mold wheel and transferring the containers to a container conveyor, the receiving device having a longitudinal direction substantially perpendicular to the opening direction of the molds and substantially parallel to a longitudinal axis of the container when released from the mold, and the longitudinal direction of the receiving device being non-horizontal; and wherein the longitudinal direction of the receiving device is between 10° and 30° from horizontal.

8. The apparatus of claim 7, wherein the longitudinal direction of the receiving device is approximately 15° from horizontal.

9. An apparatus for blow molding containers, the apparatus comprising:

a mold wheel having a rotational axis;

a plurality of molds attached to the mold wheel, the molds being openable for discharging the containers after molding, and each of the molds having an opening direction substantially parallel to the rotational axis of the mold wheel;

an air blower for introducing blow air into the molds to form the containers within the molds;

a mold opening controller for controlling when the molds are opened and closed; and a receiving device for receiving the containers dropped from the mold wheel and transferring the containers to a container conveyor, the receiving device having a longitudinal direction substantially perpendicular to the opening direction of the molds and substantially parallel to a longitudinal axis of the container when released from the mold, and the longitudinal direction of the receiving device being non-horizontal; and wherein the mold opening controller is for opening the molds such that each of the containers is released from the mold wheel after the mold molding that container has rotated past a lowest point of rotation of the mold wheel.

10. An apparatus for blow molding containers, the apparatus comprising:

a mold wheel having a rotational axis;

a plurality of molds attached to the mold wheel, the molds being openable for discharging the containers after molding, and each of the molds having an opening direction substantially parallel to the rotational axis of the mold wheel;

an air blower for introducing blow air into the molds to form the containers within the molds;

a mold opening controller for controlling when the molds are opened and closed; and a receiving device for receiving the containers dropped from the mold wheel and transferring the containers to a container conveyor, the receiving device having a longitudinal direction substantially perpendicular to the opening direction of the molds and substantially parallel to a longitudinal axis of the container when released from the mold, and the longitudinal direction of the receiving device being non-horizontal; and a blow air controller for controlling the blow air that molds the containers within the molds, wherein the blow air controller turns the blow air on and off such that the blow air is on in each mold for at least 200° of rotation of the mold wheel.

11. The apparatus of claim 10, wherein the blow air is on for each mold for at least 220° of rotation of the mold wheel.

12. The apparatus of claim 11, wherein the blow air is on for each mold for approximately 240° of rotation of the mold wheel.

13. A method of increasing the production rate of a container molding machine having a mold wheel, the mold wheel having a plurality of molds for molding containers, each of the molds having an opening direction substantially parallel to a rotational axis of the mold wheel, the method comprising:

increasing a rotational duration over which the molds are held in a closed position to mold the containers;

increasing a rotational duration over which blow air is introduced to each of the molds; and angling a receiving device for receiving the containers dropped from the mold wheel and transferring the containers to a container conveyor, the receiving device having a longitudinal direction substantially perpendicular to the opening direction of the molds and substantially parallel to a longitudinal axis of the container when released from the mold, and the angling of the receiving device being such that the longitudinal direction of the receiving device is non-horizontal; and wherein the longitudinal direction of the receiving device is angled to between 10° and 30° from horizontal.

14. The method of claim 13, wherein the longitudinal direction of the receiving device is angled to approximately 15° from horizontal.

15. A method of increasing the production rate of a container molding machine having a mold wheel, the mold wheel having a plurality of molds for molding containers, each of the molds having an opening direction substantially parallel to a rotational axis of the mold wheel, the method comprising:

increasing a rotational duration over which the molds are held in a closed position to mold the containers;

increasing a rotational duration over which blow air is introduced to each of the molds; and angling a receiving device for receiving the containers dropped from the mold wheel and transferring the containers to a container conveyor, the receiving device having a longitudinal direction substantially perpendicular to the opening direction of the molds and substantially parallel to a longitudinal axis of the container when released from the mold, and the angling of the receiving device being such that the longitudinal direction of the receiving device is non-horizontal; and wherein the molds are opened such that each of the containers is released from the mold wheel after the mold molding that container has rotated past a lowest point of rotation of the mold wheel.

16. A method of increasing the production rate of a container molding machine having a mold wheel, the mold wheel having a plurality of molds for molding containers, each of the molds having an opening direction substantially parallel to a rotational axis of the mold wheel, the method comprising:

increasing a rotational duration over which the molds are held in a closed position to mold the containers;

increasing a rotational duration over which blow air is introduced to each of the molds; and angling a receiving device for receiving the containers dropped from the mold wheel and transferring the containers to a container conveyor, the receiving device having a longitudinal direction substantially perpendicular to the opening direction of the molds and substantially parallel to a longitudinal axis of the container when released from the mold, and the angling of the receiving device being such that the longitudinal direction of the receiving device is non-horizontal; and controlling the blow air such that the blow air is on in each mold for at least 220° of rotation of the mold wheel.

17. The method of claim 16, wherein the blow air is on for each mold for at least 220° of rotation of the mold wheel.

18. The method of claim 17, wherein the blow air is on for each mold for approximately 240° of rotation of the mold wheel.

* * * * *